US010956736B2

(12) United States Patent
Hanna

(10) Patent No.: US 10,956,736 B2
(45) Date of Patent: *Mar. 23, 2021

(54) METHODS AND APPARATUS FOR POWER-EFFICIENT IRIS RECOGNITION

(71) Applicant: EyeLock LLC, New York, NY (US)

(72) Inventor: Keith J. Hanna, New York, NY (US)

(73) Assignee: EyeLock LLC, New York, NY (US)

(*) Notice: Subject to any disclaimer, the term of this patent is extended or adjusted under 35 U.S.C. 154(b) by 135 days.

This patent is subject to a terminal disclaimer.

(21) Appl. No.: 16/042,504

(22) Filed: Jul. 23, 2018

(65) Prior Publication Data
US 2018/0330162 A1 Nov. 15, 2018

Related U.S. Application Data

(63) Continuation of application No. 15/107,390, filed as application No. PCT/US2014/072175 on Dec. 23, 2014, now Pat. No. 10,032,075.
(Continued)

(51) Int. Cl.
G06K 9/20 (2006.01)
H04N 5/232 (2006.01)
(Continued)

(52) U.S. Cl.
CPC ..... G06K 9/00617 (2013.01); G06K 9/00335 (2013.01); G06K 9/00604 (2013.01);
(Continued)

(58) Field of Classification Search
CPC .......... G06K 9/00335; G06K 9/00604; G06K 9/2027; G06K 9/4661; G06K 9/00617; G06T 7/20; G06T 7/33; G06T 7/50; G06T 2207/30196; H04N 5/2256; H04N 5/23241; H04N 5/247

See application file for complete search history.

(56) References Cited

U.S. PATENT DOCUMENTS 4,641,349 A 2/1987 Flom et al.
5,259,040 A 11/1993 Hanna
(Continued)

FOREIGN PATENT DOCUMENTS

EP 2 600 220 6/2013
EP 2 600 220 A2 6/2013
(Continued)

OTHER PUBLICATIONS

B. Galvin, et al., Recovering Motion Fields: An Evaluation of Eight Optical Flow Algorithms, Proc. of the British Machine Vision Conf. (1998) (pp. 195-204).
(Continued)

Primary Examiner — Siamak Harandi
(74) Attorney, Agent, or Firm — Foley and Lardner LLP

(57) ABSTRACT

Disclosed herein are systems and methods wherein the iris biometric of an individual person is acquired using a mobile or static device. This acquisition may involve the use of active illumination and repeated use of the camera and processor, as examples. These modules consume considerable power however, and this can significantly reduce battery life. There is a need therefore for a power-efficient iris recognition system.

20 Claims, 16 Drawing Sheets

Related U.S. Application Data

(60) Provisional application No. 61/945,961, filed on Feb. 28, 2014, provisional application No. 61/931,809, filed on Jan. 27, 2014, provisional application No. 61/920,215, filed on Dec. 23, 2013.

(51) Int. Cl.
| | |
|---|---|
| *G06K 9/00* | (2006.01) |
| *G06T 7/33* | (2017.01) |
| *G06T 7/50* | (2017.01) |
| *G06K 9/46* | (2006.01) |
| *G06T 7/20* | (2017.01) |
| *H04N 5/225* | (2006.01) |
| *H04N 5/247* | (2006.01) |

(52) U.S. Cl.
CPC ......... *G06K 9/2027* (2013.01); *G06K 9/4661* (2013.01); *G06T 7/20* (2013.01); *G06T 7/33* (2017.01); *G06T 7/50* (2017.01); *H04N 5/2256* (2013.01); *H04N 5/23218* (2018.08); *H04N 5/23241* (2013.01); *H04N 5/232411* (2018.08); *H04N 5/247* (2013.01); *G06T 2207/30196* (2013.01)

(56) References Cited

U.S. PATENT DOCUMENTS

| | | |
|---|---|---|
| 5,291,560 A | 3/1994 | Daugman |
| 5,488,675 A | 1/1996 | Hanna |
| 5,572,596 A | 11/1996 | Wildes et al. |
| 5,581,629 A | 12/1996 | Hanna et al. |
| 5,613,012 A | 3/1997 | Hoffman et al. |
| 5,615,277 A | 3/1997 | Hoffman |
| 5,737,439 A | 4/1998 | Lapsley et al. |
| 5,764,789 A | 6/1998 | Pare et al. |
| 5,802,199 A | 9/1998 | Pare et al. |
| 5,805,719 A | 9/1998 | Pare et al. |
| 5,835,083 A * | 11/1998 | Nielsen ................. G06F 1/3209 345/211 |
| 5,838,812 A | 11/1998 | Pare et al. |
| 5,901,238 A | 5/1999 | Matsushita |
| 5,953,440 A | 9/1999 | Zhang et al. |
| 5,978,494 A | 11/1999 | Zhang |
| 6,021,210 A | 2/2000 | Camus et al. |
| 6,028,949 A | 2/2000 | McKendall |
| 6,064,752 A | 5/2000 | Rozmus et al. |
| 6,069,967 A | 5/2000 | Rozmus et al. |
| 6,144,754 A | 11/2000 | Okano et al. |
| 6,192,142 B1 | 2/2001 | Pare et al. |
| 6,247,813 B1 | 6/2001 | Kim et al. |
| 6,252,977 B1 | 6/2001 | Salganicoff et al. |
| 6,289,113 B1 | 9/2001 | McHugh et al. |
| 6,366,682 B1 | 4/2002 | Hoffman et al. |
| 6,373,968 B2 | 4/2002 | Okano et al. |
| 6,377,699 B1 | 4/2002 | Musgrave et al. |
| 6,424,727 B1 | 7/2002 | Musgrave et al. |
| 6,483,930 B1 | 11/2002 | Musgrave et al. |
| 6,532,298 B1 | 3/2003 | Cambier et al. |
| 6,542,624 B1 | 4/2003 | Oda |
| 6,546,121 B1 | 4/2003 | Oda |
| 6,594,376 B2 | 7/2003 | Hoffman et al. |
| 6,594,377 B1 | 7/2003 | Kim et al. |
| 6,652,099 B2 | 11/2003 | Chae et al. |
| 6,700,998 B1 | 3/2004 | Murata |
| 6,714,665 B1 | 3/2004 | Hanna et al. |
| 6,760,467 B1 | 7/2004 | Min et al. |
| 6,850,631 B1 | 2/2005 | Oda et al. |
| 6,917,695 B2 | 7/2005 | Teng et al. |
| 6,980,670 B1 | 12/2005 | Hoffman et al. |
| 6,985,608 B2 | 1/2006 | Hoffman et al. |
| 7,095,901 B2 | 8/2006 | Lee et al. |
| 7,146,027 B2 | 12/2006 | Kim et al. |
| 7,248,719 B2 | 7/2007 | Hoffman et al. |
| 7,271,939 B2 | 9/2007 | Kono |
| 7,385,626 B2 | 6/2008 | Aggarwal et al. |
| 7,414,737 B2 | 8/2008 | Cottard et al. |
| 7,418,115 B2 | 8/2008 | Northcott et al. |
| 7,428,320 B2 | 9/2008 | Northcott et al. |
| 7,542,590 B1 | 6/2009 | Robinson et al. |
| 7,558,406 B1 | 7/2009 | Robinson et al. |
| 7,558,407 B2 | 7/2009 | Hoffman et al. |
| 7,574,021 B2 | 8/2009 | Matey |
| 7,583,822 B2 | 9/2009 | Guillemot et al. |
| 7,606,401 B2 | 10/2009 | Hoffman et al. |
| 7,616,788 B2 | 11/2009 | Hsieh et al. |
| 7,639,840 B2 | 12/2009 | Hanna et al. |
| 7,693,307 B2 | 4/2010 | Rieul et al. |
| 7,697,786 B2 | 4/2010 | Camus et al. |
| 7,715,595 B2 | 5/2010 | Kim et al. |
| 7,719,566 B2 | 5/2010 | Guichard |
| 7,797,606 B2 | 9/2010 | Chabanne |
| 7,869,627 B2 | 1/2011 | Northcott et al. |
| 7,929,732 B2 | 4/2011 | Bringer et al. |
| 7,978,883 B2 | 7/2011 | Rouh et al. |
| 8,009,876 B2 | 8/2011 | Kim et al. |
| 8,025,399 B2 | 9/2011 | Northcott et al. |
| 8,092,021 B1 | 1/2012 | Northcott et al. |
| 8,132,912 B1 | 3/2012 | Northcott et al. |
| 8,170,295 B2 | 5/2012 | Fujii et al. |
| 8,233,680 B2 | 7/2012 | Bringer et al. |
| 8,243,133 B1 | 8/2012 | Northcott et al. |
| 8,279,042 B2 | 10/2012 | Beenau et al. |
| 8,317,325 B2 | 11/2012 | Raguin et al. |
| 2005/0024516 A1* | 2/2005 | Fish ....................... H04N 5/232 348/333.03 |
| 2005/0084137 A1 | 4/2005 | Kim et al. |
| 2006/0074986 A1 | 4/2006 | Mallalieu et al. |
| 2007/0211922 A1 | 9/2007 | Crowley et al. |
| 2009/0074256 A1 | 3/2009 | Haddad |
| 2009/0097715 A1 | 4/2009 | Cottard et al. |
| 2009/0161925 A1 | 6/2009 | Cottard et al. |
| 2009/0231096 A1 | 9/2009 | Bringer et al. |
| 2010/0021016 A1 | 1/2010 | Cottard et al. |
| 2010/0074477 A1 | 3/2010 | Fujii et al. |
| 2010/0079508 A1 | 4/2010 | Hodge et al. |
| 2010/0127826 A1 | 5/2010 | Saliba et al. |
| 2010/0183199 A1 | 7/2010 | Smith et al. |
| 2010/0246903 A1 | 9/2010 | Cottard |
| 2010/0278394 A1 | 11/2010 | Raguin et al. |
| 2010/0310070 A1 | 12/2010 | Bringer et al. |
| 2011/0158486 A1 | 6/2011 | Bringer et al. |
| 2011/0194738 A1 | 8/2011 | Choi et al. |
| 2011/0277518 A1 | 11/2011 | Lais et al. |
| 2012/0240223 A1 | 9/2012 | Tu |
| 2012/0257797 A1 | 10/2012 | Leyvand et al. |
| 2013/0063611 A1 | 3/2013 | Papakipos et al. |
| 2013/0106681 A1 | 5/2013 | Eskilsson et al. |
| 2014/0270492 A1* | 9/2014 | Christopulos .......... G06K 9/627 382/159 |

FOREIGN PATENT DOCUMENTS

| | | |
|---|---|---|
| WO | WO-2010/062371 | 6/2010 |
| WO | WO-2011/093538 | 8/2011 |
| WO | WO-2013/060826 | 5/2013 |
| WO | WO-2013/060826 A1 | 5/2013 |

OTHER PUBLICATIONS

International Search Report & Written Opinion on PCT/US2014/072175 dated Mar. 30, 2015.
International Search Report & Written Opinion on PCT/US2014/072175 dated Jul. 7, 2016.
J. R. Bergen, et al., Hierarchical Model-Based Motion Estimation, European Conf. on Computer Vision (1993) (pp. 237-252).
K. Nishino, et al., The World in an Eye, IEEE Conf. on Pattern Recognition, vol. 1, at pp. 444-451 (Jun. 2004).
R. Kumar, et al., Direct recovery of shape from multiple views: a parallax based approach, 12th IAPR Intl Conf. on Pattern Recognition (1994)(pp. 1-5).

(56) References Cited

OTHER PUBLICATIONS

Supplementary European Search Report on EP 14873327 dated Aug. 21, 2017.
First Office Action for CN Appl. No. 201480074193.3, dated Nov. 1, 2018.
Foreign Action other than Search Report on BR 112016014692-1 dated Mar. 31, 2020.
Foreign Action other than Search Report on in 201617024523 dated Aug. 21, 2020.
U.S. Notice of Allowance on U.S. Appl. No. 15/107,390 dated Mar. 21, 2018.
U.S. Office Action on U.S. Appl. No. 15/107,390 dated Nov. 7, 2017.

* cited by examiner

METHODS AND APPARATUS FOR POWER-EFFICIENT IRIS RECOGNITION

CROSS-REFERENCE TO RELATED PATENT APPLICATION

This application is a continuation application of and claims priority to U.S. application Ser. No. 15/107,390, filed Jun. 22, 2016, and entitled "Methods and Systems for Power-Efficient Iris Recognition", which is a national stage of, and claims priority to and the benefit of International Patent Application No.: PCT/US2014/072175, filed Dec. 23, 2014, titled "METHODS AND APPARATUS FOR POWER-EFFICIENT IRIS RECOGNITION" which in turn claims priority to U.S. provisional application 61/920,215, filed Dec. 23, 2013, titled "METHODS AND APPARATUS FOR POWER-EFFICIENT IRIS RECOGNITION"; U.S. provisional application 61/931,809, filed Jan. 27,2014, titled "METHODS AND APPARATUS FOR A COMPACT AWARENESS SENSOR AND CONTROLLER" and U.S. provisional application No. 61/945,961, filed Feb. 28, 2014, titled "EFFICIENT ILLUMINATION CONTROL FOR IRIS RECOGNITION," all of which are hereby incorporated by reference in their entireties for all purposes.

BACKGROUND

Iris recognition systems typically comprise at least a sensor and an illuminator and these components consume significant power. There is therefore a need for controlling these components in particular ways so that iris recognition is enabled, while at the same time the average power consumed by the components is reduced.

SUMMARY

Embodiments of the present invention include systems and methods for power-efficient iris recognition. In one example, the system may include an iris acquisition mode determination module that determines the operating mode of the system. The operating modes may include i) a mode where it is determined that no iris recognition is possible, ii) a mode where it is determined that iris recognition is possible but not preferred, and iii) a mode where it is determined that iris recognition is possible and preferred. The determination of the modes may be based on attributes sensed by the system that relate to iris recognition that may include the detected position of the eyes, the detected speed of the user, the detected brightness of the imagery, the detected change in the imagery over time, or the detected physical acceleration of the system. The system may also include at least one of: a sensor power mode controller, a sensor region of interest controller, an illumination power mode controller, an illumination region of interest controller, and a gaze-motion determination module that, in response to the mode determination, controls or makes use of the sensor and illuminator in particular ways that enable functionality of the iris recognition system while at the same time reducing the average power consumed by the system over time.

The system can function by decomposing the iris recognition system into different modes of operation, including those disclosed immediately above. The system is designed such that in each mode of operation the sensor and illuminator are controlled such that just enough of their functionality is enabled so that the system can acquire sufficient data from the sensor in order to determine that it is preferable to switch to a different mode of operation of the iris recognition system. The system is designed such that the overall functionality of the iris recognition system is still enabled despite the switching between the different modes of operation. The system is designed such that the sensor and illuminator consume substantially different power levels in each mode, so that the system is highly efficient with regards to power usage over time. In some embodiments, these power levels may be an ultra-low power level corresponding to the mode where it is determined that no iris recognition is possible, a low power level corresponding to the mode where it is determined that iris recognition is possible but not preferred, and a standard power level corresponding to the mode where it is determined that iris recognition is possible and preferred.

In some embodiments the system adjusts the power consumed by the sensor by adjusting the time period between sensor enablements over time. For example, if the sensor is enabled only every 10 seconds, then less power is consumed overall compared to the power consumed if the sensor was enabled every 1 second.

In some other embodiments, the system adjusts the power consumed by the sensor by adjusting the spatial window in which that the sensor region of interest is active, even if the time between enablements is constant. The rate at which pixels are clocked out of a sensor is typically fixed, so that reducing the size of the active spatial window of the sensor reduces the time during which the sensor is enabled, and therefore reduces the average power consumed by the sensor.

The rate of sensor enablement as well as the size of the spatial window in which the sensor region is active in the different modes are designed so that the performance of the iris recognition system is maintained.

In some other embodiments, the system adjusts the power consumed by the illumination by adjusting the power of the illuminator while in each mode. The system is designed such that in some modes of operation less illumination power is required than in others. The system is also designed such that the illumination may be controlled to be at different brightness levels during different active spatial windows of the sensor.

In some other embodiments, a gaze-motion measurement module takes advantage of the sensor and illuminator in the iris recognition system. This avoids the need for a separate gaze-motion measurement module that would consume additional power. In addition, the gaze-motion measurement module computes the motion of the gaze of the user directly, as opposed to the absolute gaze direction of the user where ill-conditioned triangulation and calibration methods are required, and the result is a robust, noise-free measurement of gaze motion that leverages the same sensor and illuminator used for iris recognition.

In summary, in some embodiments, the system may comprise: at least one sensor for iris acquisition mode determination and iris recognition, an iris acquisition mode detection module that controls a sensor power control module, at least one of an illumination power control module or an illumination region of interest control module; wherein the iris acquisition mode determination module determines at least one of the conditions: iris recognition is not possible, iris recognition is possible but not preferred, iris recognition is possible and preferred; wherein the determined iris acquisition mode controls the sensor power control module to adjust the time between enablement of the sensor, and an iris recognition module.

In some other embodiments, the system may comprise: at least one sensor for iris acquisition mode determination and iris recognition, an iris acquisition mode detection module that controls a sensor region of interest control module, at least one of an illumination power control module or an illumination region of interest control module; wherein the iris acquisition mode determination module determines at least one of the conditions: iris recognition is not possible, iris recognition is possible but not preferred, iris recognition is possible and preferred; wherein the determined iris acquisition mode controls a sensor region of interest control module to adjust the active pixel region of interest of the sensor, and an iris recognition module In some embodiments the system may operate by making: a determination that one or both eyes of the user are detected to be within the image region corresponding to the field of view of the illumination used for iris recognition; a determination that the user is detected to be within the depth of field of the iris recognition system; a determination that the user is detected to be moving at a speed less than a speed threshold; a determination that the brightness level of the acquired image is less than a threshold; a determination that the change detected between images acquired at two or more different times is below a threshold; a determination that a measurement of the acceleration of the device from an accelerometer is below a threshold.

In some embodiments, the aforementioned speed threshold is 13.75 cm/sec.

In some embodiments wherein when the iris acquisition mode determination module has determined that the mode is that no iris recognition is possible, then the time period between sensor enablements is less than 20 seconds.

In some embodiments wherein when the iris acquisition mode module has determined that the mode is one of: that iris recognition is possible and conditions are such that preferred iris imagery may be acquired, or that iris recognition is possible and conditions are such that non-preferred iris imagery may be acquired, then the time period between sensor enablements is less than 5.5 seconds.

In some embodiments wherein when the iris acquisition mode module has determined that the mode is that no iris recognition is possible, the active pixel region of interest of the sensor is adjusted to be less than the region of interest of the sensor.

In some embodiments wherein the active sensor region of interest is adjusted so that the ratio of the active vertical window to the iris diameter is equal to or greater than 3.12.

In some embodiments wherein the illumination region of interest control module configures the illumination to illuminate one region of the image with a first illumination power and the other regions of the image with a second illumination power to produce a resultant bright and dark banded image.

In some embodiments the aforementioned bright and dark banded image is processed by normalizing the intensities inside the image region of interest corresponding to the first illumination power and the image region of interest corresponding to the second illumination power.

In some embodiments, the active sensor region of interest is moved over time so that the combined accumulated active sensor region of interest over time covers a larger area of the sensor region compared to the area of the region of interest.

In some embodiments, a first sensor configuration is used for iris acquisition mode determination and a second sensor configuration is used for iris recognition In some embodiments that include a gaze-motion detection module, the system may comprise: at least one sensor for iris acquisition mode determination and iris recognition; an iris acquisition mode detection module that controls a sensor power control module; at least one of an illumination power control module or an illumination region of interest control module; wherein the iris acquisition mode determination module determines at least one of the conditions: iris recognition is not possible, iris recognition is possible but not preferred, iris recognition is possible and preferred; wherein the determined iris acquisition mode controls the sensor power control module to adjust the time between enablement of the sensor; an iris recognition module; a gaze-motion determination module comprising an alignment module that determines at least one common feature between two or more images of the eye acquired over time and aligns the images to that feature, and a motion detection module that computes the motion of one or more remaining features in the eye.

In some other embodiments that also include a gaze-motion detection module, the system may comprise: at least one sensor for iris acquisition mode determination and iris recognition; an iris acquisition mode detection module that controls a sensor region of interest control module; at least one of an illumination power control module or an illumination region of interest control module; wherein the iris acquisition mode determination module determines at least one of the conditions: iris recognition is not possible, iris recognition is possible but not preferred, iris recognition is possible and preferred; wherein the determined iris acquisition mode controls a sensor region of interest control module to adjust the active pixel region of interest of the sensor; an iris recognition module; a gaze-motion determination module comprising an alignment module that determines at least one common feature between two or more images of the eye acquired over time and aligns the images to that feature, and a motion detection module that computes the motion of one or more remaining features in the eye.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
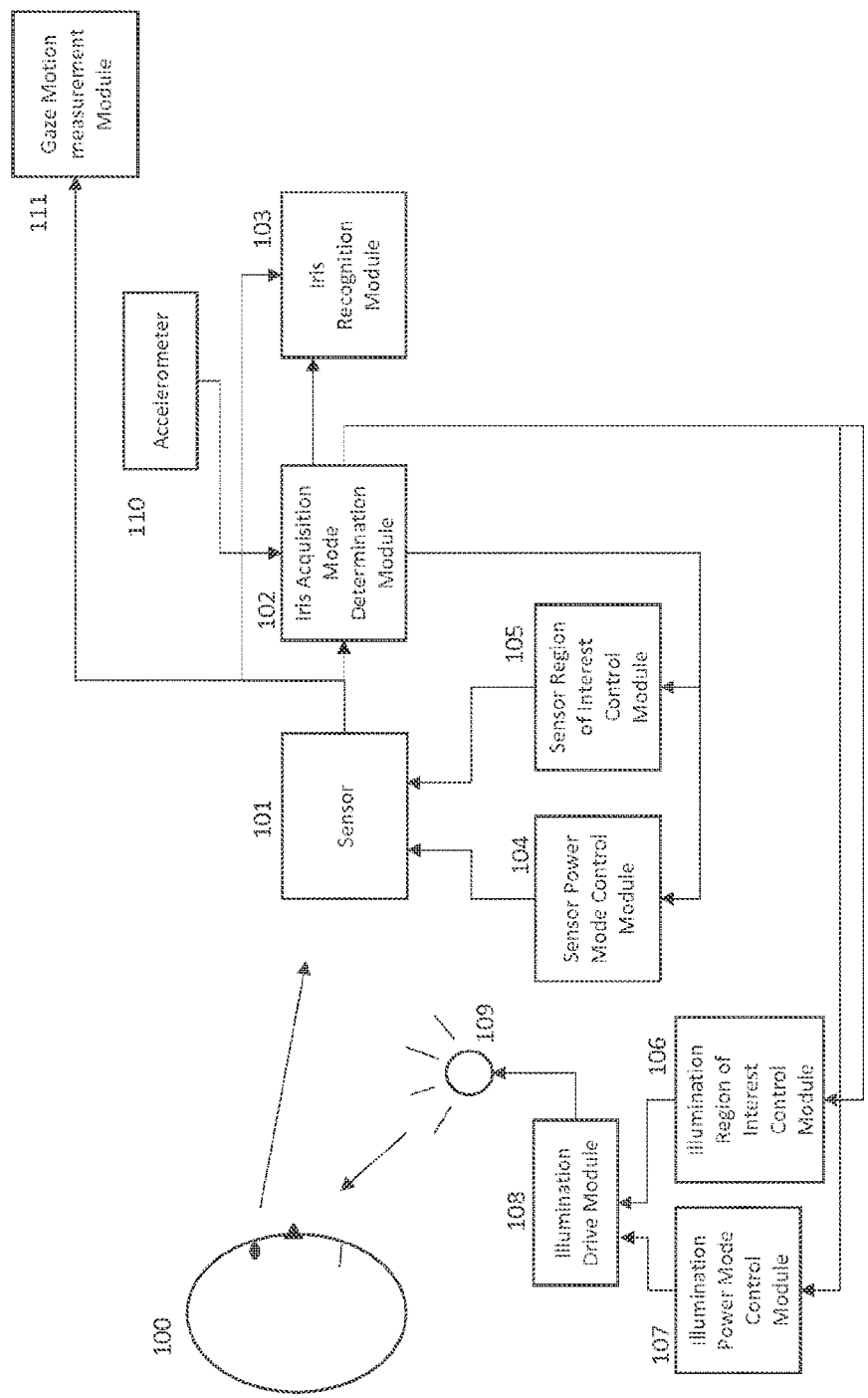
FIG. 1 shows a block diagram of the power-efficient iris recognition system, according to some embodiments.

FIG. 1 shows an embodiment of the system. A user 100 is facing a sensor 101 that is controlled by a sensor power mode controller 104 and a sensor region of interest controller 105. The sensor power mode controller is capable of placing the sensor into at least two modes: low power and standard power modes. In low power mode the sensor may not be able to acquire imagery that is suitable for iris recognition but yet the sensor can be immediately switched to standard power mode where imagery can be acquired immediately. The sensor region of interest controller is capable of configuring the sensor such that not all of the sensor pixels are enabled and only a windowed region of interest is active. The read-out rate of the pixels is typically constant in terms of pixels per second, and therefore reducing the number of pixels being read out reduces the duration that the sensor needs to be in standard power mode and therefore reduces the power used by the sensor.

The output of the sensor 100 is fed an iris recognition module 103. An example of such an iris recognition module is U.S. Pat. No. 5,291,560 by Daugman, which is incorporated herein by reference in its entirety. The output of the sensor 100 is also fed to an iris acquisition mode determination module 102. The preferred iris acquisition detector module processes the imagery to control the sensor power mode controller module 104 and the sensor region of interest controller 105. The iris acquisition mode determination module 102 also controls an illumination power mode control module 107 and an illumination region of interest control module 106. The illumination power mode control module is capable of controlling an illumination drive module 108 such that the illumination power can be in low-power and standard power modes. In low-power mode the illuminator 109 driven by the illumination drive module 108 controls the illuminator 109 such that it produces fewer photons during the integration time of the active sensor pixels compared to standard illumination power mode and therefore consumes less power. The illumination region of interest control module 106 is capable of also controlling the illumination drive module 108 so that the illumination is only enabled during the time that the sensor pixels are active, in some embodiments.

The iris acquisition mode determination module 102 determines at least two modes: conditions that are preferred for iris image acquisition, and conditions that are not-preferred for iris image acquisition. In some embodiments, a third mode is a condition where there is no possibility of iris image acquisition.

When conditions are determined to be not-preferred for iris image acquisition, then the system controls the sensor and illuminators and processing such that minimal power is consumed, yet enough data is acquired to make the determination of whether conditions are preferred or not-preferred for iris image acquisition. This means that the system can rapidly control the sensor and the illuminators so that preferred imagery for iris recognition is acquired.

The factors that control whether conditions are determined to be preferred or not-preferred for iris recognition or whether iris recognition is not possible may be a function of the specifics of the iris recognition module.

The albedo or reflectance of the iris is relatively low compared to the albedo of the face, and as a result significant power is expended by the illumination to produce enough photons that get reflected off the iris and into the sensor to produce imagery with sufficient signal to noise ratio for robust iris recognition. This may mean that the photons are focused in a relatively narrow beam that may be +/−10 degree to +/−30 degree. The field of view of many camera lenses on mobile phones or on laptop or other static devices may be much larger, for example +/−45 degree to +/−60 degrees. The narrow beam of illumination may be targeted at or near the center of the field of view of the camera. In some embodiments, one factor controlling whether conditions are preferred for iris image acquisition is that one or both eyes of the user are detected to be within the image region corresponding to the field of view of the illumination.

Another factor relates to the depth of field of the iris recognition system. Due to the low albedo or reflectance of the iris, and due to its relatively small size (e.g., approximately 10.5 mm in diameter) the lens used to form the image on the sensor typically has a large aperture and also has a large magnification in order to image sufficient number of pixels across the iris for recognition (typically 100-200 pixels). A large aperture and large magnification typically corresponds to a small depth of field of the optical system of the iris recognition system, which may be 1"-5" in some embodiments. In some embodiments therefore, one factor controlling whether conditions are preferred for iris image acquisition is that the user is detected to be within the depth of field of the iris recognition system.

Another factor relates to motion blur of the imagery. Due to the low albedo and reflectance of the iris, the exposure time of the pixels on the sensor may be large so that any significant motion of the eye during the exposure time results in a blurred image of the iris that is not preferred for iris recognition. The exposure time may be approximately 4 msecs and the iris may be acquired such that it is 100 pixels in diameter. In some embodiments a motion blur of 5 pixels of the iris may be a limit for successful iris recognition. This then corresponds to a lateral motion of the user of 5 pixels over 4 msecs. With a nominal iris diameter of 1.1 cm, 5 pixels corresponds to lateral user motion of 5/100*1.1 cm/4 msecs 13.75 cm/sec. In some embodiments therefore, one factor controlling whether conditions are preferred for iris image acquisition is that the user is detected to be moving less than a particular speed or velocity. In some embodiments a preferred threshold for the particular speed or velocity is 13.75 cm/sec. As exposure times increase then the preferred threshold reduces proportionately. For example, with an exposure time of 8 msecs the preferred threshold is 6.875 cm/sec. With an exposure time of 16 msecs, the preferred threshold is 3.4375 cm/sec. In some embodiments therefore, one factor controlling whether conditions are preferred for iris image acquisition is that the user is detected to be moving with a speed less than 13.75 cm/sec. In some other embodiments, a factor controlling whether conditions are preferred for iris image acquisition is that the user is detected to be moving with a speed less than 6,875 cm/sec. In some other embodiments, a factor controlling whether conditions are preferred for iris image acquisition is that the user is detected to be moving with a speed less than 3.4375 cm/sec.

Another factor relates to determining whether there is no possibility of performing iris recognition, typically because the device is unused. If the system makes such a determination, then the system may enable an ultra-low power mode that consumes less power than the aforementioned low-power mode, but such that the time to switch between ultra-low power mode to standard power mode is longer than the time is takes to switch between low-power to standard power mode. This longer time from ultra-low-power mode to standard mode compared to low-power to standard mode is acceptable in the iris recognition system since the time between the user sitting down or picking up to use the device and the time that iris recognition is needed far logging on or other authentication is typically longer compared to a user already using a system and the time between the user initiating a transaction and needing to perform iris recognition.

In some embodiments, the system determines whether there is no possibility of performing iris recognition based on a measurement of darkness in the image. In the case of a laptop with a camera mounted on the screen, if the laptop screen is closed then no iris recognition is possible since there is no possibility of the camera facing a user. Either a visible or an infra-red camera will be almost in contact with the keyboard or bottom part of the laptop and will therefore acquire dark images. If the laptop is opened however then the camera may observe some brightness due to the ambient illumination in the environment or due to the reflection of active illumination from the device off objects in front of the device.

In some other embodiments, the system determines whether there is a possibility of performing iris recognition based on a measurement of change in the image. In the case of a laptop with a camera mounted on the screen, if the laptop screen is open then either a visible or an infra-red camera will observe the scene. A user moving in the far vicinity of the device can result in change in the acquired imagery over time indicating that there is a possibility that iris recognition may be required imminently. Also, a change in the acquired imagery over time acquired from a mobile phone indicates that the device is moving and therefore potentially held by a user, indicating that there is a possibility that iris recognition may be required imminently, as opposed to a mobile device left on a table where the imagery acquired does not change over time. A measurement from an accelerometer on the device can also indicate that the device is moving.

In some other embodiments therefore, a factor controlling whether conditions are such that there is no possibility of iris recognition is that the brightness level of the acquired image is below a threshold. In some other embodiments, a factor controlling whether conditions are such that there is no possibility of iris recognition is that the change detected between images acquired over time is below a threshold. In some other embodiments, a factor controlling whether conditions are such that there is no possibility of iris recognition is that a measurement of an accelerometer mounted on the device is below a threshold.

Figure 2:
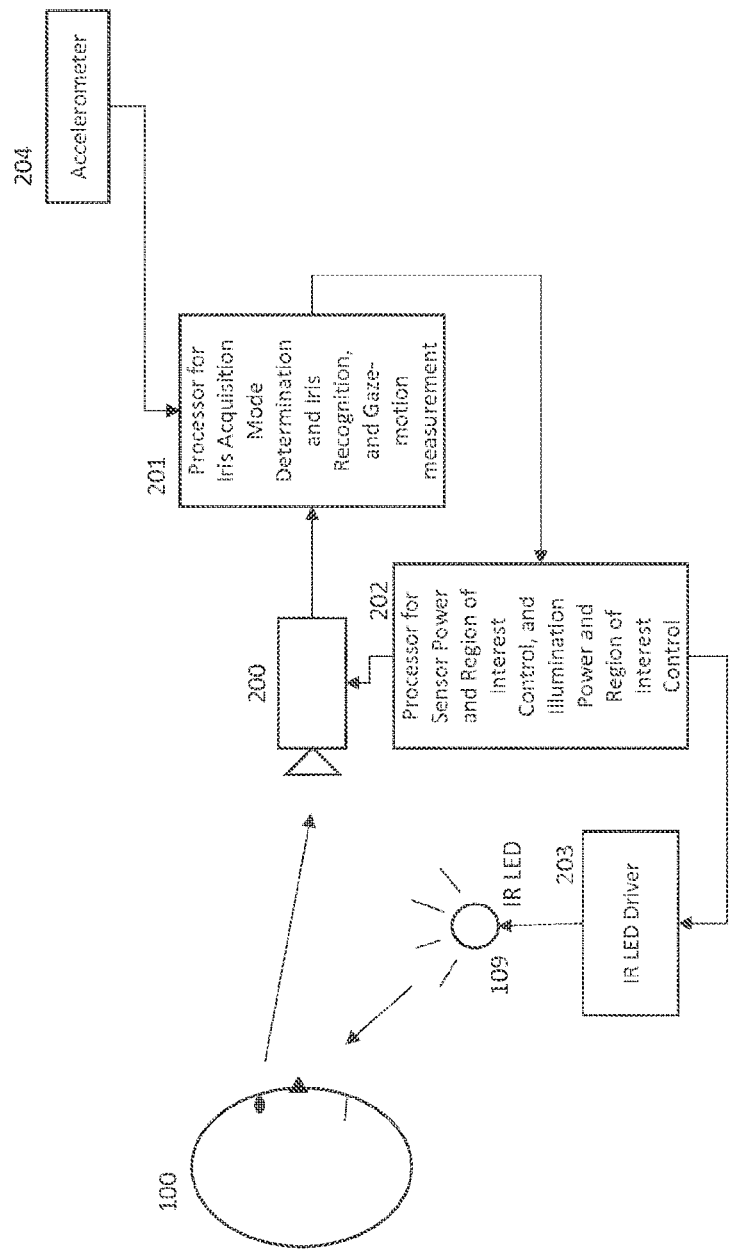
FIG. 2 shows a physical implementation of the power-efficient iris recognition system, according to some embodiments.
Figure 3:
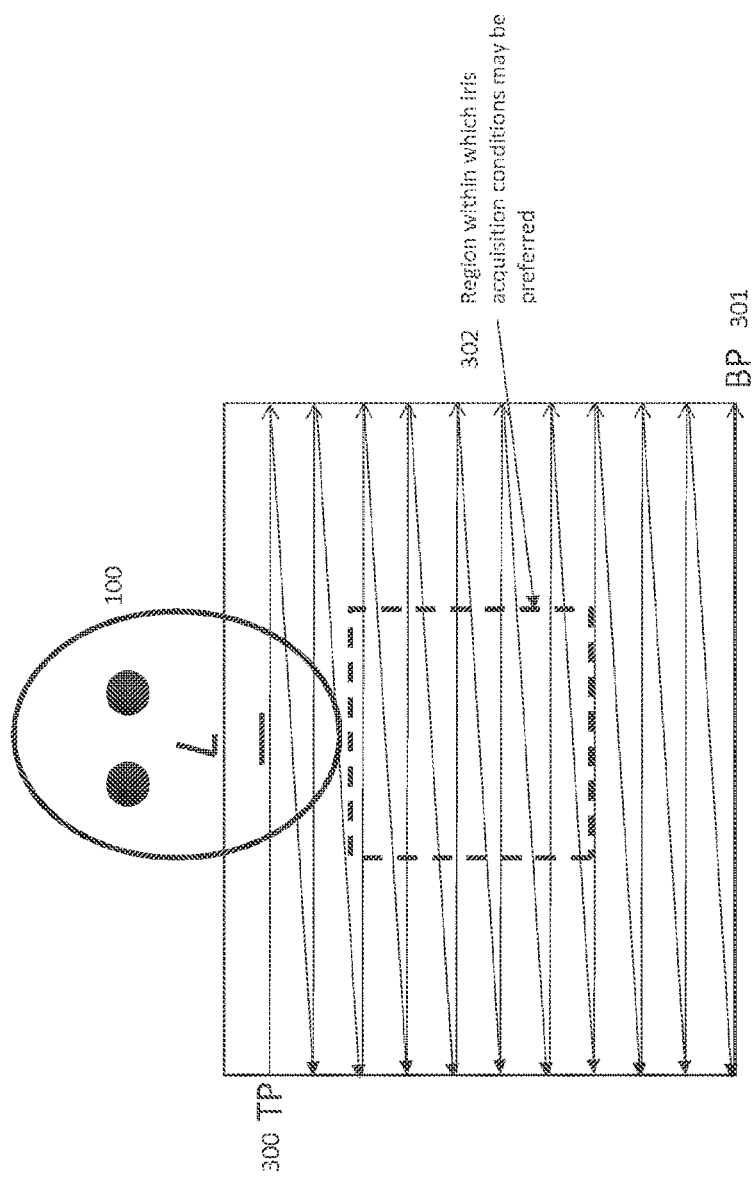
FIG. 3 shows a user positioned in front of the sensor in a position that is not-preferred for iris recognition, according to some embodiments.
Figure 4:
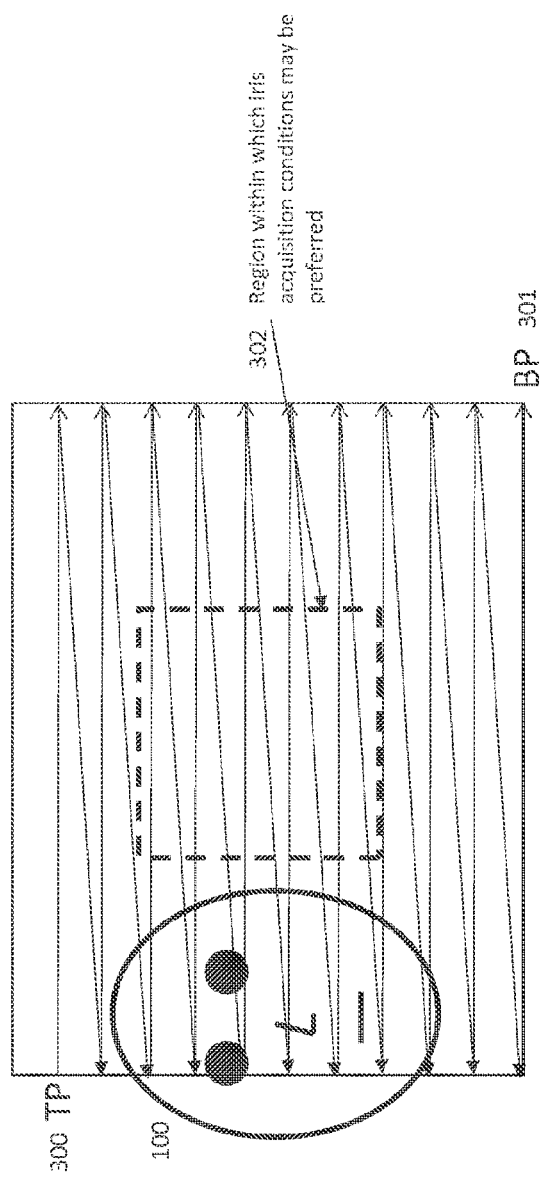
FIG. 4 shows a user positioned in front of the sensor in another position that is not-preferred for iris recognition, according to some embodiments.
Figure 5:
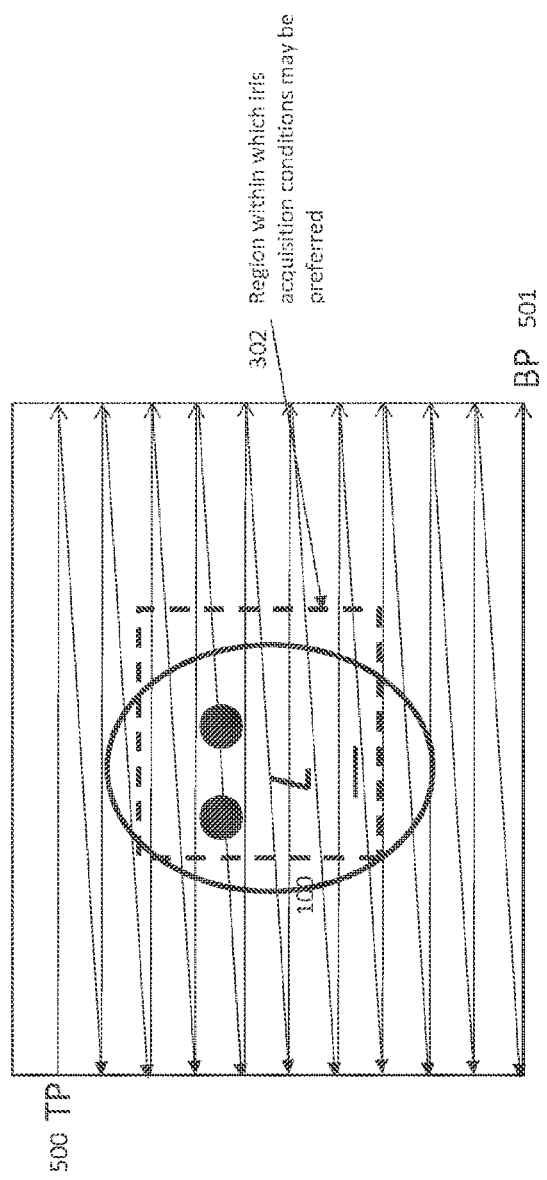
FIG. 5 shows a user positioned in front of the sensor in another position that is preferred for iris recognition, according to some embodiments.

In some embodiments the iris acquisition mode determination module 102 determines the aforementioned factors using several methods. As described previously, in some embodiments, one factor controlling whether conditions are preferred for iris image acquisition is that one or both eyes of the user are detected to be within the image region corresponding to the field of view of the illumination. This can be performed by detecting the location of the face in the image. Methods for detecting faces are described, for example, in M. Turk, A. Pentland, "Eigenfaces for Recognition," Journal of Cognitive Neuroscience, Vol. 3, No. 1, 1991, pp. 71-86, which is incorporated herein by reference. This recovers the location of the eyes in the image. In FIGS. 3, 4 and 5, the dotted region within the camera field of view is the region that is preferred for iris acquisition since it is illuminated as described previously. In FIGS. 3 and 4, the eyes are outside the preferred region of interest. In FIG. 5, the eyes are, inside the preferred region of interest. In FIG. 2, images are acquired using the camera and sensor 200 and then face detection process is performed on the processor 201. The comparison of the recovered eye positions with the pre-determined preferred region of interest for iris recognition is also performed on processor 201.

Also as described previously, one factor controlling whether conditions are preferred for iris image acquisition is that the user is detected to be within the depth of field of the iris recognition system. This can be performed by taking the output of the face detector module and by determining the scale of the face in pixels based on, for example, the recovered pixel separation of the eyes. The separations of the eyes, nose and mouth are relatively fixed across the human population, and also the lens used in such an iris recognition system in some embodiments has a fixed focal length. This means that the separation of the eyes, for example, can be used to determine a range or distance of the user from the device, using a pre-calibrated look up table stored on processor 201 that relates eye-pixel-separation to user range in inches. The depth of field and nominal operating range of the system is known in advance from the optical configuration of the iris recognition system and this gives a minimum and maximum distance within which imagery preferred for iris recognition can be acquired. The pre-calibrated look-up table can therefore be used to determine the scale of the face, for example the eye-separation in pixels, to determine whether the user is between the minimum and maximum distance from the device so that imagery preferred for iris recognition can be acquired, or lies outside the range.

Also as described previously, one factor controlling whether conditions are preferred for iris image acquisition is that the user is detected to be moving with a speed less than 13.75 cm/sec, or less than 6.875 cm/sec, or less than 3.4375 cm/sec, depending on the exposure time. This speed can be computed by detecting the position of the face using the aforementioned method on successive frames of the system acquired over a known time interval. The focal length of the lens is fixed and known, the sensor parameters are known and the range of the user can be estimated from the scale of the face as described previously, and this allows the motion of the user to be computed from the change in pixel locations of the eyes in the image. For example, if the position of the left eye is detected to change 50 pixels over 0.1 seconds, and the nominal diameter of the iris is 100 pixels corresponding to 1.1 cm, then the user is moving at 50/100*1.1 cm/0.1 seconds=5.5 cm/sec.

Also as described previously, a factor controlling whether conditions are such that there is no possibility of iris recognition is that the brightness level of the acquired image is below a threshold. This can be determined by acquiring imagery from the camera 200 and computing the average brightness of the imagery on processor 201. If the average brightness is below a threshold then the iris acquisition mode determination module 102 implemented on processor 201 may determine that there is no possibility of iris recognition.

Also as described previously, a factor controlling whether conditions are such that there is no possibility of iris recognition is that the change detected between images acquired over time is below a threshold. This can be determined by acquiring at least two images at different time periods from the camera 200, by computing the difference of the at least two images on processor 201 at each pixel, by computing the square of the difference of the at least two images at each pixel, and by averaging the resulting squared differenced image. If the average change or difference is below a threshold then the iris acquisition mode determination module 102 implemented on processor 201 may determine that there is no possibility of iris recognition.

Also as described previously, a factor controlling whether conditions are such that there is no possibility of iris recognition is that a measurement of an accelerometer mounted on the device is below a threshold. An accelerometer 204 is connected to the processor 201. If the accelerometer reading is determined by the processor 201 to be below a threshold, then the system may determine that there is no possibility of iris recognition.

Returning to FIG. 1, the iris acquisition mode determination module 102 sends the mode determination to the sensor region of interest control module 105, the sensor power mode control module 104, the illumination region of interest control module 106, and the illumination power mode control module 107. These modules configure the sensor and control the illuminator in order to enable different power modes. As discussed previously the modes determined may comprise a determination that iris recognition is not possible, a determination that the conditions for iris recognition are possible but not preferred, and a determination that the conditions for iris recognition are possible and preferred. These three modes may correspond to three power configurations corresponding to ultra-low power, low power and standard power respectively. The sensor and illumination power control modules 105, 104, 106, 107 receive the mode determination and configure the sensor and the illumination to achieve the various power levels.

As discussed previously, in some embodiments the system has been designed such that in ultra-low power mode, less power is consumed compared to low-power mode, but such that the time to switch between ultra-low power mode to standard power mode is longer than the time is takes to switch between low-power to standard power mode. This longer time to switch from ultra-low-power mode to standard mode compared to low-power to standard mode is acceptable in the iris recognition system since the time between the user sitting down or picking up to use the device and the time that iris recognition is needed for logging on or other authentication is typically longer compared to a user already using a system and the time between the user initiating a transaction and needing to perform iris recognition.

The sensor region of interest control module 105, the sensor power mode control module 104, the illumination region of interest control module 106, and the illumination power mode control module 107 are now described in more detail. These modules are implemented on a processor 202 that outputs resulting control signals to the camera sensor 200 and an illumination driver 203 that may comprise a field-effect transistor (FET) that converts illumination control signals into current that in turn drives the illuminator 109.

Figure 6:
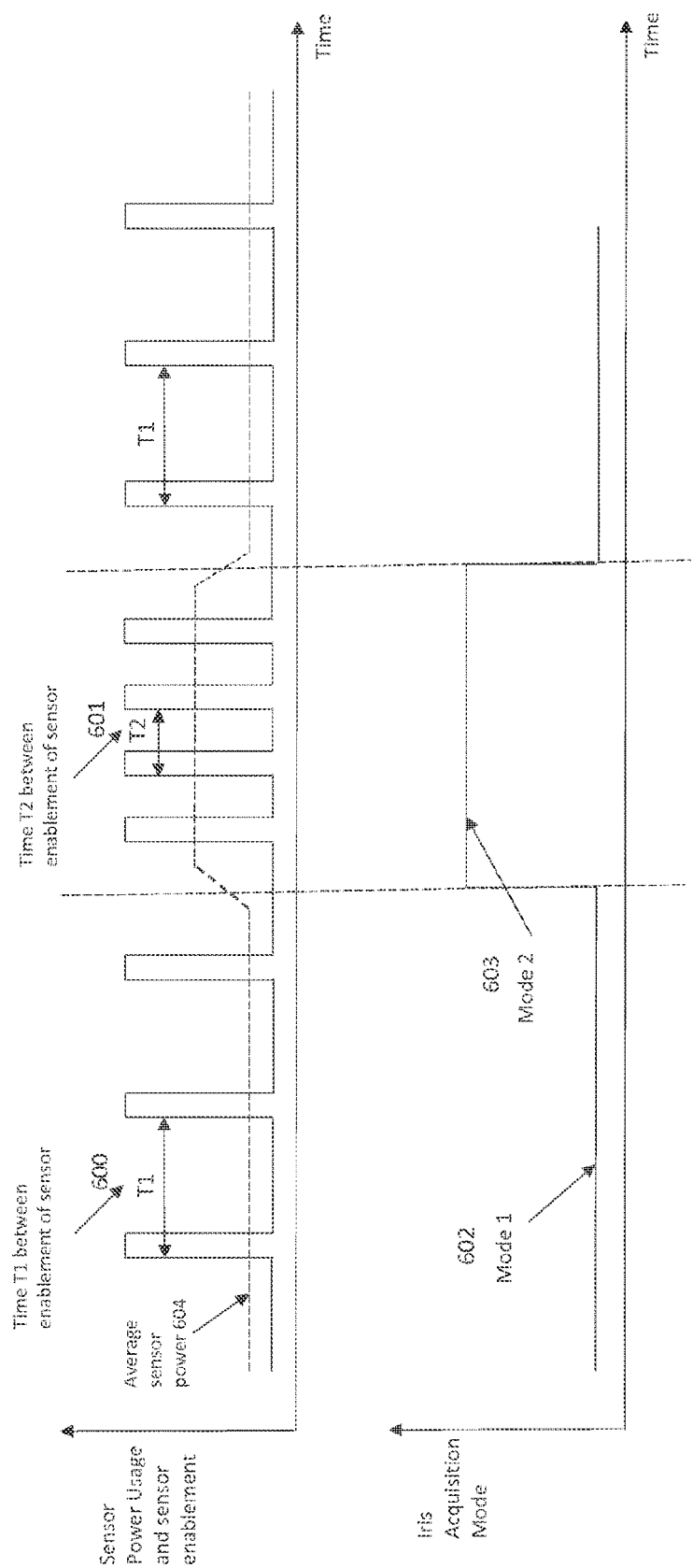
FIG. 6 shows the enablement of the sensor over time, and the average power consumed by the sensor, for different determined iris acquisition modes of operation, according to some embodiments.

FIG. 6 shows the operation of the sensor power mode control module 104. The solid line on the top graph shows a signal from the control module that enables the sensor. The bottom graph shows an output of the iris mode determination module. Modes 1 (602) and 2 (603) in this case may correspond to ultra-low power and low-power respectively, or may correspond to ultra-low power and standard power respectively, or may correspond to low-power and standard power respectively. The sensor power mode control module 104 enables the sensor periodically. In iris acquisition mode 1, the time period between sensor enablements is T1 (600). In iris acquisition mode 2, the time period between sensor enablement is T2 (601), such that T2 is less than T1. The longer the time is between sensor enablements, then the lower the average power 604 that is consumed by the sensor.

In some embodiments, in ultra-low power mode, the time period TU between enablements may be less than 20 seconds. This time period typically provides sufficient time between the user sitting down or picking up to use the device and the time that iris recognition is needed for logging on, for example. In low-power mode, the time period between enablements may be determined by computing the likelihood that the system will miss detecting that the conditions for acquiring iris imagery are preferred since, for example, the user may have moved in and out of the preferred conditions for iris image acquisition between sensor enablements. In one embodiment, if the width of the portion of the sensor illuminated sufficiently for iris recognition by the illuminator is 500 pixels, then at a speed of 500 pixels of lateral motion of the user between sensor enablements, the system will be unable to detect that the user was in fact in a condition that was preferred for iris image acquisition since the eyes would be detected on one side outside the preferred region and then detected on the other side outside of the preferred region, and never detected within the preferred region even though the user was present there. In this embodiment therefore, it is therefore preferred to choose a time interval in low power mode that is less than a speed of 500 pixels between sensor enablements. If the expected lateral motion of the user in front of the device is 1 cm/sec, and the nominal diameter of the user's iris is 1.1 cm, and the number of pixels across the iris is 100, then the time interval between sensor enablements is (500/100*1.1)/1=5.5 seconds. In some applications, particularly if a user is sitting at a laptop and not holding a mobile device, the speed of the user may be larger requiring that the time period TL between enablements in low-power mode to be less than 5.5 seconds. In some embodiments, the time period TS between enablements in standard mode may be equal to or smaller to the time period TL in low-power mode.

Figure 7:
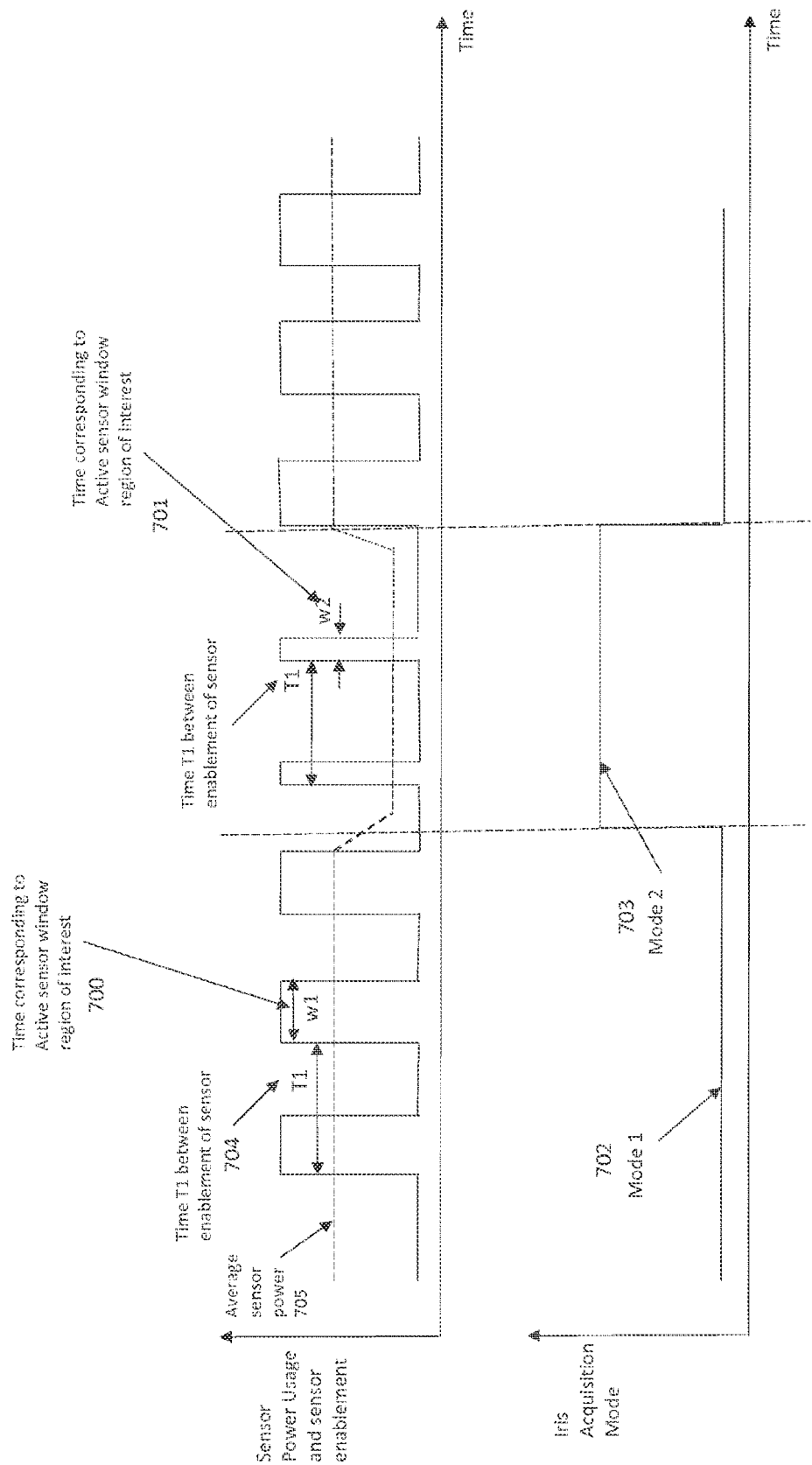
FIG. 7 shows the active region of interest window of the sensor over time, and the average power consumed by the sensor, for different determined iris acquisition modes of operation, according to some embodiments.

FIG. 7 shows the operation of the sensor region of interest control module 105. For clarity, the effects of the sensor power mode control 104 have been removed from the description such that the time T1 (704) between enablements is the same in any power mode. It is to be understood however that the different methods of power efficiency due to each of the modules 104, 105, 106, 107 can be used in combination.

Figure 8:
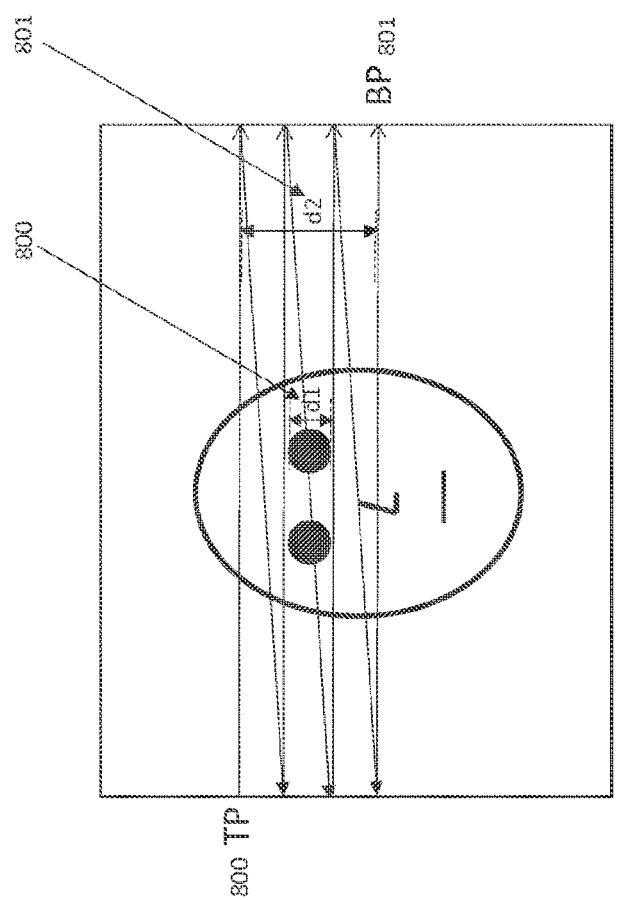
FIG. 8 shows a user position in front of a sensor such that the eyes are within the active region of interest window of the sensor, according to some embodiments.

The solid line in the top graph in FIG. 7 shows the time during which the sensor is enabled, and the average power used by the sensor assuming a fixed time T1 (704) between sensor enablements as discussed. The bottom graph shows a determination of the iris acquisition mode. Mode 1 (702) may correspond to any power mode, and mode 2 (703) may also correspond to any different power mode. The top graph in FIG. 7 shows that in mode 1 the sensor has been enabled so that pixels within a window w1 (700) of the sensor are acquired, and that in mode 2 the pixels with a window w2 (701) of the sensor are acquired. Sensors typically have the same clockout frequency regardless of the area being imaged, and therefore the smaller the pixel window being acquired then the shorter the duration that the sensor is turned on and the less power is consumed over time. The solid line in the top graph in FIG. 7 shows that the active window of the sensor w2 (701) is smaller in mode 2 compared to the active window of the sensor w1 (700). The average power over time consumed by the sensor indicated by the dotted line 705 is therefore less in mode 2 than in mode 1. The effects of modifying the window of the sensor on the imagery acquired is shown in FIG. 8. FIG. 8 shows a top scan point (TP) (800) and a bottom scan point (BP) (801) and shows that only a portion of the field of view of the sensor is acquired as may be the case in mode 2 in the example. This can be compared to FIG. 5 where the top scan point (TP) (500) and the bottom scan point (BP) (501) are configured such that the entire image is acquired.

In some embodiments, and referring to FIG. 8, in ultra-low power mode the sensor region of interest controller 105 may configure TP (800) and BP (801) such that only a small portion of the sensor is acquired. This is because in the methods described previously for determining the iris acquisition mode, only a smaller portion of the imagery may be required for detecting darkness in the imagery or for detecting changes in the acquired imagery. This is significant if the image sensor has a high resolution and has many pixels. In some embodiments in ultra-low-power mode the number of pixels between TP and BP may be less than 1,000,000 pixels.

In some embodiments TP and BP may be configured to depend on the motion or position of the user that has been computed by the methods describe previously in the iris acquisition mode detector module 102. The active sensor window defined by TP and BP can be controlled by the sensor region of interest module 105 so that the recovered position of the eyes lie between the top scan point TP and the bottom scan point BP. Therefore TP and BP can be varied over time by module 105 as the user moves. Due to the time period between image acquisitions, it is possible that the user may move so quickly that by the time of the second acquisition the user's eyes are no longer between the top and bottom scan point. In order to resolve this, the difference between TP and BP is set so that the vertical coverage d2 (801) of the sensor (defined with respect to a sensor with rows horizontally scanned) on the subject that corresponds to a lens of a particular field of view is such that any expected motion of the user will result in the eyes still being within the region defined by TP and BP. In one embodiment, if the expected motion of the user is 3.4375 cm/sec with a time period between sensor enablements of 1 seconds and the iris diameter is 1.1 cm as discussed previously, then TP and BP should be configured so that the ratio of active vertical window d2 (801) to the iris diameter d1 (802) is equal to or greater than (3.4375/1)/1.1=3.12.

Figure 9:
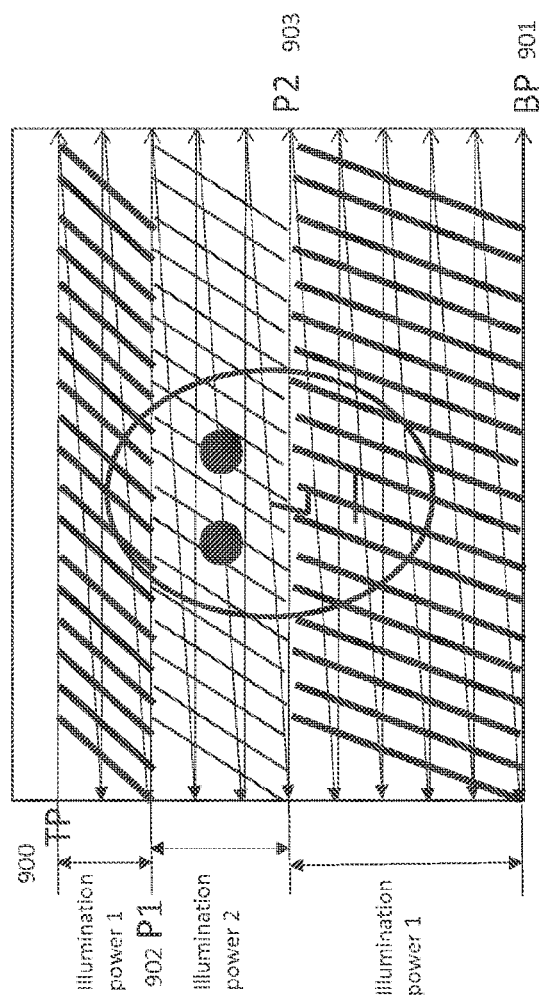
FIG. 9 shows a user positioned in front of a sensor such that the active region of interest window of the illumination is changing over the active region of interest of the sensor such that a portion of the active region of interest of the sensor is illuminated at a different brightness level compared to other portions of the active region of interest of the sensor, according to some embodiments.

FIG. 9 shows the operation of the illumination region of interest control module. It shows that the illumination is controlled to have a second power level when the scan point of the image sensor is between P1 (902) and P2 (903), and a first power level otherwise. In some embodiments P1 may equal TP (900) and P2 may equal BP (901) such that there is no purpose in having illumination outside the active window region since the sensor is not acquiring any data during that time. In this case the first power level may be zero. In other cases P1 and P2 may be controlled such that P1 and P2 lie within and BP such that a region of interest of the sensor corresponding to be being between P1 and P2 is illuminated more than other portions of the sensor. This may reduce the power used by the illumination by illuminating only the iris area sufficiently well for iris recognition performed in module 103, and only illuminating the rest of the face area sufficiently well for mode determination performed in module 102. The methods for detecting the mode have been described previously, and may include darkness detection, change detection and face detection in some embodiments.

In order to detect whether there is change or darkness (two of the factors determined by the iris acquisition mode determination module 102 described previously) relatively little illumination is required by the algorithms and the illumination can be set to be at a low level. Similarly, the features of the face are coarser in scale than the features of the iris, so that the facial features can be blurred spatially to reduce image noise clue to the lower illumination level yet successful face detection as described earlier can still be performed, in the region where iris imagery is acquired for iris recognition by module 103 the illumination may be set at a higher level. The resultant image however has a bright spatial band due to the increased illumination that may reduce the performance of same of the mode detection algorithms, such as the face detector. This bright spatial band can be removed by a normalization module that inputs the boundary locations P1 and P2 corresponding to a change in illumination setting during an image scan, and an algorithm that performs a normalization of the image intensities across the boundaries. The normalization module may take the average value of the scan line on one side of the boundary and the average value of the scan line on the other side of the boundary, take the ratio of the average values, and then normalize the intensities using the computed ratio so that the re-computed average values of the normalized scan lines on either side of the boundary are the same.

Figure 10:
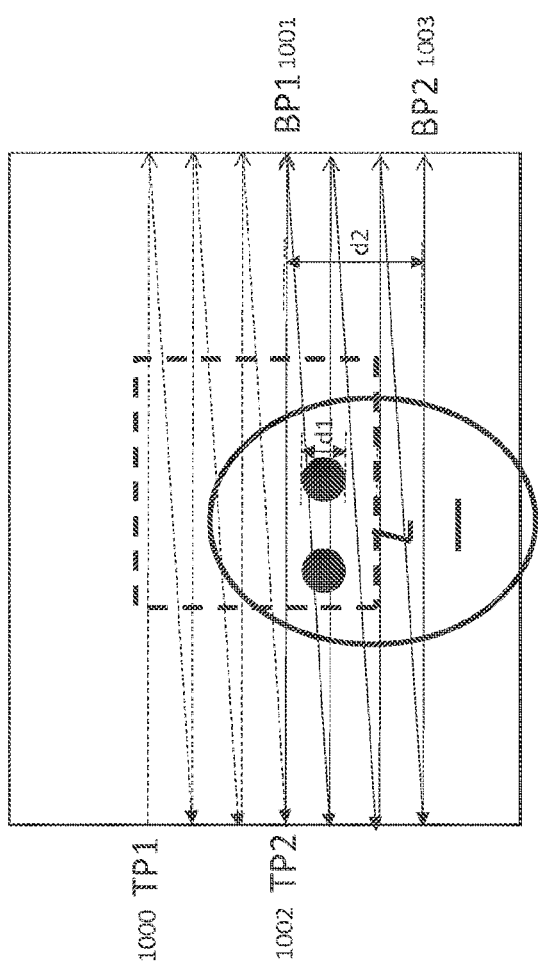
FIG. 10 shows a user position in front of a sensor such that the active region of interest window of the sensor is changing over a time period, according to some embodiments.
Figure 11:
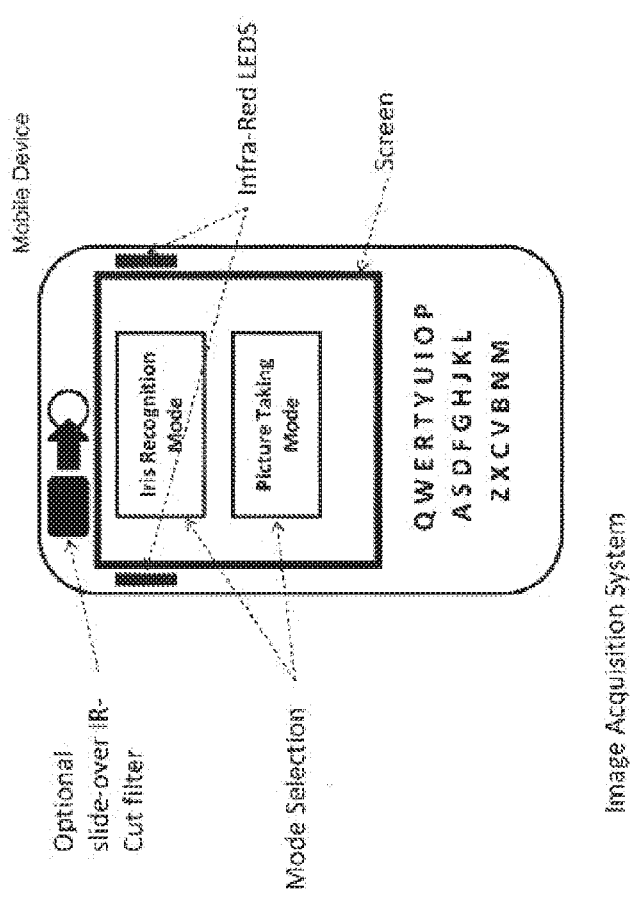
FIG. 11 shows an implementation of the system on a mobile phone, according to some embodiments.

FIG. 10 shows another example of the sensor image region controller adjusting the sensor region of interest over time such that at one time instant the region is defined by TP1 (1000) and BP1 (1001), and at a second time instant is defined by TP2 (1002) and BP2 (1003) so that over time the combined sensor region TP1 to BP2 is acquired. The process can be repeated so that the active window of interest covers some or all of the sensor field of view. This allows the location of the eyes to be detected for iris recognition by the iris recognition module 103 or for the iris acquisition mode detection module 102 if they move outside the conditions preferred for iris image acquisition.

Figure 12:
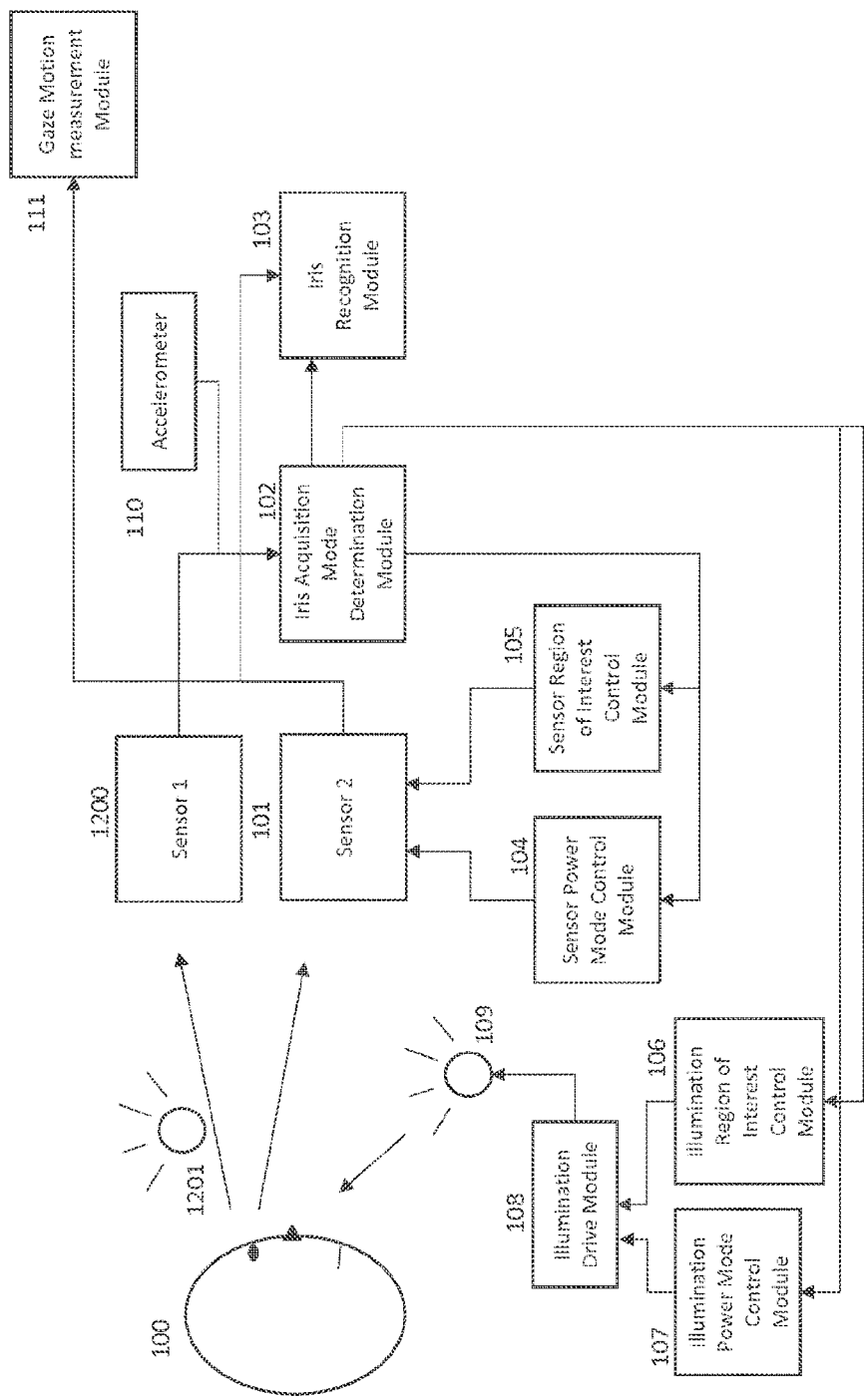
FIG. 12 shows a block diagram of the system such that one sensor is used to determine the iris acquisition mode of operation, and a second sensor is used to perform iris recognition, according to some embodiments.
Figure 13:
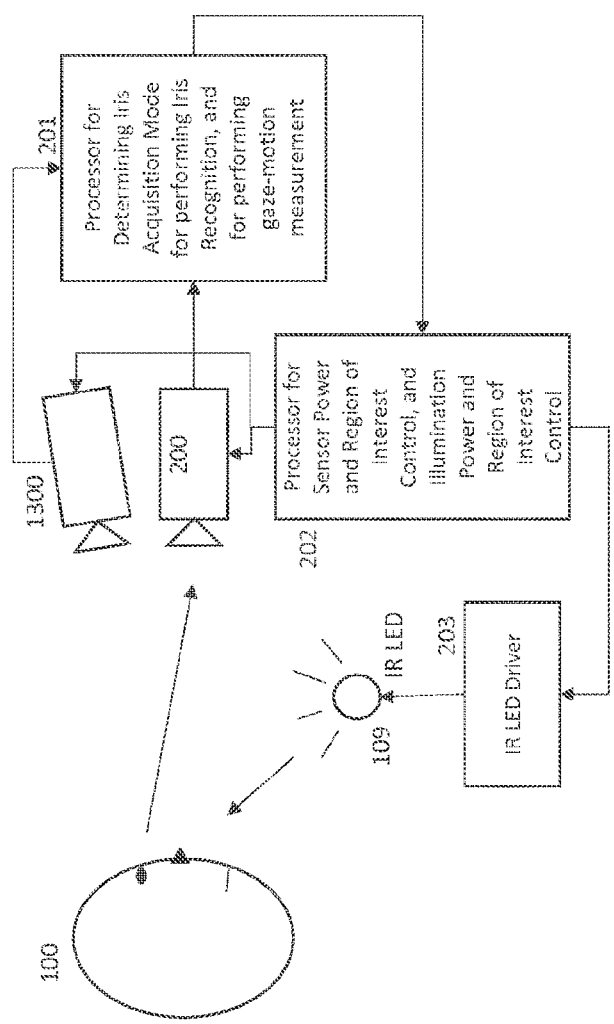
FIG. 13 shows an implementation of the system in FIG. 12, according to some embodiments.

FIG. 12 shows an embodiment of the system where iris recognition and mode detection are performed by two different sensors. In this embodiment a first sensor 1200 that is sensitive to ambient illumination is used to perform iris acquisition mode detection 102 and a second sensor 101 that is sensitive to infra-red illumination is used to perform iris recognition 103. The ambient illumination is indicated by 1201, and the infra-red illumination is indicated by 109. This approach may have an advantage in that ambient illumination requires no active illumination and therefore less power is consumed by the system since in some of the modes of operation (such as mode: no iris recognition is possible) only ambient illumination may be sufficient to perform darkness detection or change detection to switch the system into a different mode where iris recognition may be possible. The first and second sensors may be co-located in a single pixel array so that some pixels are sensitive to visible illumination while some pixels are sensitive to infra-red illumination. FIG. 13 shows an implementation of the system whereby the outputs of both sensors 1300 and 200 respectively are fed into a processor module 201 which determines the iris acquisition mode and also performs iris recognition, and also sends control signals to a second processor 202 that performs the detailed sensor region of interest control, sensor power enablement control, illumination region of interest control and illumination brightness control.

In some embodiments the system also comprises a gaze-motion measurement module (111 in FIG. 1). This relates to the power efficiency in the iris recognition system since the imagery acquired for the purposes of the iris recognition module (103) and the iris acquisition mode detection module (102) and some of the same processing steps may be used by a gaze-motion detector module (111) as now described, so that a separate gaze-motion detector module is not required and therefore the overall power of the system is reduced.

Figure 14:
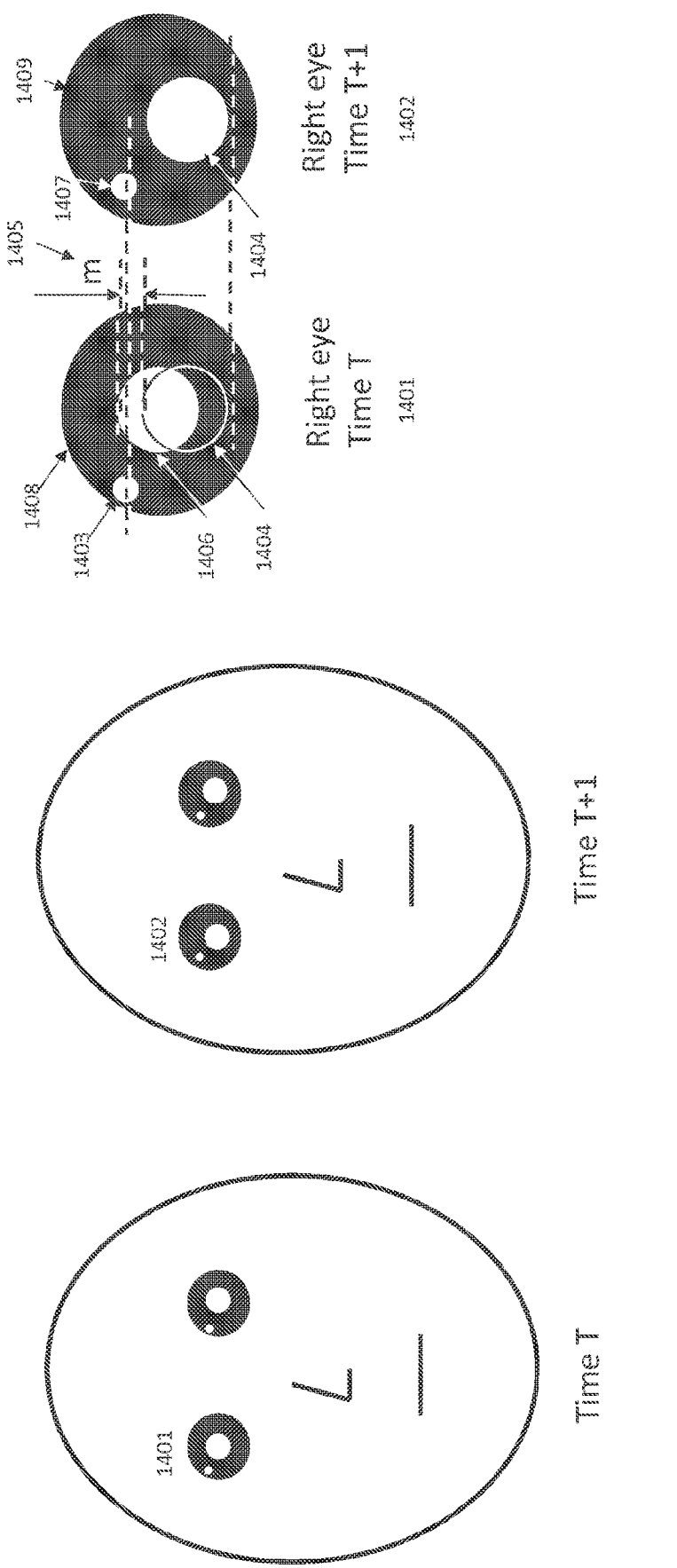
FIG. 14 shows, on the left, images acquired by the sensor of a user changing their gaze between two different time periods, and on the right magnified images of the right eye of the user at the two different time periods, according to some embodiments.
Figure 15:
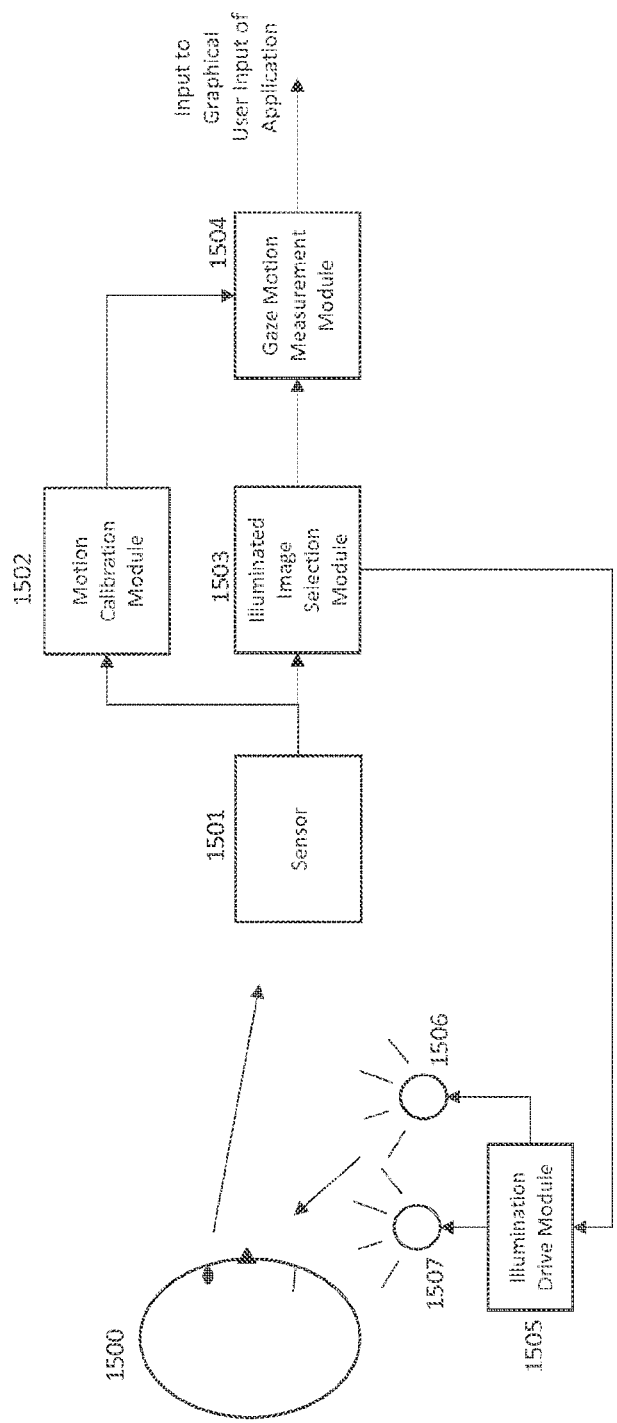
FIG. 15 shows a block diagram of another embodiment of the gaze motion measurement module, according to some embodiments.
Figure 16:
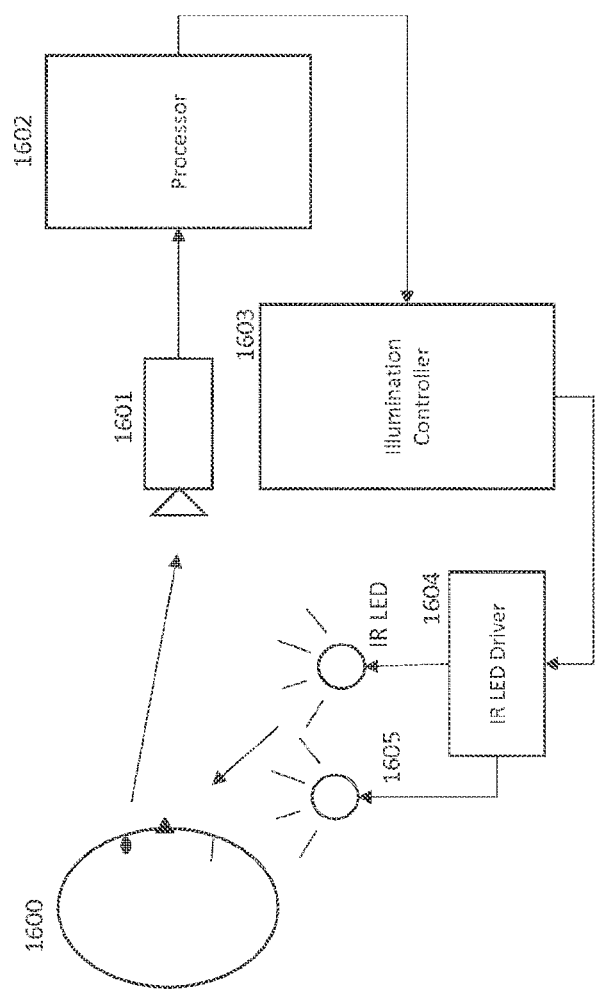
FIG. 16 shows an implementation of the gaze detection module in FIG. 15, according to some embodiments.

FIG. 14 on the left shows a first image of the user's face acquired at time T and a second image acquired at time T+1. The right eye of the user is indicated by 1401 and 1402, respectively, and these are magnified for clarity on the right of FIG. 14. The illuminator (109) used for iris acquisition mode detection and for iris recognition can create a specularity 1403 and 1407 in the acquired images of the eye. The processing used for iris recognition may compute the location of the pupil/iris boundary 1406. 1404 and the location of the iris/sclera boundary 1408, 1409. Rather than compute the absolute gaze orientation of the user, the motion of the gaze orientation of the user can be computed. In some embodiments, the motion can be computed by aligning the pixel location of the specular reflections, and by computing the difference m (1405) in the location of the pupil/iris boundary. By computing the motion of the gaze directly as opposed to an absolute gaze direction in each case and then subtracting the difference, then the result is a more stable estimation process, resulting in smoother and more robust graphical user input control.

A method for detecting the location of the specularities 1403, 1407 is to threshold the image and to compute the centroid of pixels above the threshold. A method for detecting the location and parameters of the pupil/iris boundaries 1406, 1404 and the iris/sclera boundaries 1408, 1409 is to perform a Hough transform to detect the parameters of circular shapes in the imagery as described in U.S. Pat. No. 3,069,654 which is incorporated herein by reference in its entirety.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the coupling structures and diffractive optical elements disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system for power efficient iris recognition, the system comprising:
    a sensor to acquire at least one image of an iris of a user; and
    circuitry operably coupled to the sensor, configured to:
        provide electrical power to the sensor;
        determine an operational mode of the system using an output from the sensor, the operational mode indicative of a feasibility of performing iris recognition of the user based on the at least one image of the iris; and
        adjust a time period between successive sensing enablements of the sensor according to the determined operational mode so as to control the electrical power provided to the sensor.

2. The system of claim 1 wherein the circuitry is configured to set the time period between successive sensing enablements of the sensor to be less than 20 seconds in response to a determination that the operational mode is indicative that no iris recognition is possible.

3. The system of claim 1 wherein the circuitry is configured to set the time period between successive sensing enablements of the sensor to be less than 5.5 seconds in response to a determination that the operational mode is indicative that iris recognition is possible but preferred or that iris recognition is possible and preferred.

4. The system of claim 1 wherein the circuitry is configured to determine the operational mode according to at least one of:
    a determination that one or both eyes of the user are detected to be within a region illuminated by a light source used for iris recognition;
    a determination that the user is detected to be within a depth of field of the sensor;
    a determination that the user is moving at a speed less than a speed threshold;
    a determination that the brightness level of the at least one image is less than a brightness threshold;
    a determination that a change between a first image and a second image acquired by the sensor is below a change threshold; or
    a determination that an acceleration of the sensor is below an acceleration threshold.

5. The system of claim 4 wherein the speed threshold is 13.75 cm/second.

6. The system of claim 1 wherein the sensor is configured to move an active sensor region of interest of the sensor over time so as to image a region larger than the active sensor region of interest.

7. The system of claim 1 wherein the sensor is configured to be in a first sensor configuration for iris acquisition mode determination and to be in a second sensor configuration for iris recognition.

8. The system of claim 1, wherein the circuitry is further configured to:
    determine at least one common feature between at least two images of an eye of the user acquired over time and to align the at least two images to the at least one common feature; and
    estimate motion of at least one other features of the eye.

9. A system for a power efficient iris recognition, the system comprising:
    at least one sensor to acquire at least one image of an iris of a user, the at least one sensor having a spatial area of coverage; and
    circuitry operably coupled to the at least one sensor, configured to:
        determine an operational mode of the system using an output from the at least one sensor, the operational mode indicative of a feasibility of performing iris recognition of the user based on the at least one image of the iris; and
        adjust a proportion of the spatial area of coverage, within which the at least one sensor's sensor pixels are active, according to the operational mode.

10. The system of claim 9 wherein the circuitry is configured to determine the operational mode according to at least one of:
    a determination that one or both eyes of the user are detected to be within a region illuminated by a light source used for iris recognition;
    a determination that the user is detected to be within a depth of field of the at least one sensor;
    determination that the user is moving at a speed less than a speed threshold;
    a determination that the brightness level of the at least one image is less than a brightness threshold;
    a determination that a change between a first image and a second image acquired by the at least one sensor is below a change threshold; or
    a determination that an acceleration of the at least one sensor is below an acceleration threshold.

11. The system of claim 10 wherein the speed threshold is 13.75 cm/second.

12. The system of claim 9 wherein the circuitry is configured to adjust the proportion of the spatial area of coverage, within which the at least one sensor's sensor pixels are active, to be less than a region of interest of the at least one sensor in response to a determination that the operational mode is indicative that no iris recognition is possible.

13. The system of claim 9 wherein the circuitry is configured to adjust the proportion of the spatial area of coverage, within which the at least one sensor's sensor pixels are active, such that the ratio of an active vertical window of the at least one sensor to a diameter of the iris is equal to or greater than 3.12.

14. The system of claim 9, wherein the circuitry is configured to illuminate a first region of the image with a first power and a second region of the image with a second illumination power so as to produce a resultant bright and dark banded image.

15. The system of claim 14 wherein the circuitry is configured to process the bright and dark banded image by normalizing the intensities in the image corresponding to the first illumination power and the image corresponding to the second illumination power.

16. The system of claim 9 wherein the at least one sensor is configured to be in a first sensor configuration for iris acquisition mode determination and to be in a second sensor configuration for iris recognition.

17. The system of claim 9, wherein the circuitry is configured to:
determine at least one common feature between at least two images of an eye of the user acquired over time and to align the at least two images to the at least one common feature; and
estimate motion of at least one other features of the eye.

18. A method for a power efficient iris recognition, the method comprising:
acquiring, by at least one sensor, at least one image of an iris, the at least one sensor having a spatial area of coverage;
determining, by an iris acquisition mode detector operably coupled to the sensor and to the iris recognition engine, an operational mode of the at least one sensor using an output from the at least one sensor, the operational mode indicative of a feasibility of performing iris recognition based on the at least one image of the iris; and
adjusting, by a sensor region of interest controller operably coupled to the sensor, a proportion of the spatial area of coverage, within which the at least one sensor's sensor pixels are active, according to the determined operational mode.

19. The method of claim 18, comprising adjusting, by the sensor region of interest controller, the proportion of the spatial area of coverage, within which the at least one sensor's sensor pixels are active, to be less than a region of interest of the sensor in response to a determination that the operational mode is indicative that no iris recognition is possible.

20. The method of claim 18, comprising adjusting, by the sensor region of interest controller, the proportion of the spatial area of coverage, within which the at least one sensor's sensor pixels are active, such that the ratio of an active vertical window of the
at least one sensor to a diameter of the iris is equal to or greater than 3.12.

* * * * *